United States Patent [19]
Fyles et al.

[11] Patent Number: 5,895,719
[45] Date of Patent: Apr. 20, 1999

[54] BOROSILICATE GLASSES AND SECOND SURFACE MIRRORS THEREOF

[75] Inventors: Kenneth Melvin Fyles, Wigan; Helen Louise Eaves, Warrington; Peter Shorrock, Wigan, all of United Kingdom

[73] Assignee: Pilkington plc, St. Helens, United Kingdom

[21] Appl. No.: 08/760,995

[22] Filed: Dec. 5, 1996

[30] Foreign Application Priority Data

Dec. 8, 1995 [GB] United Kingdom ............. 9525111

[51] Int. Cl.$^6$ ............................................. B32R 17/00
[52] U.S. Cl. .................... 428/220; 428/426; 428/432; 428/434; 501/65; 501/66; 136/256
[58] Field of Search ......................... 428/426, 220, 428/432, 434; 501/65, 66; 136/256

[56] References Cited

U.S. PATENT DOCUMENTS

| | | | |
|---|---|---|---|
| 3,653,970 | 4/1972 | Iles | 136/89 |
| 3,770,335 | 11/1973 | Colburn et al. | 359/360 |
| 3,994,708 | 11/1976 | von Reth et al. | 65/325 |
| 5,017,521 | 5/1991 | Vale | 501/64 |
| 5,057,464 | 10/1991 | Miwa | 501/53 |
| 5,219,801 | 6/1993 | Shouock | 501/65 |
| 5,320,684 | 6/1994 | Amick | 136/256 |
| 5,411,601 | 5/1995 | Higuchi | 136/256 |
| 5,744,409 | 4/1998 | Hashinoto | 501/65 |

FOREIGN PATENT DOCUMENTS

| | | |
|---|---|---|
| 0261885 | 3/1988 | European Pat. Off. |
| 0505061 | 9/1992 | European Pat. Off. |
| 0879945 | 1/1994 | European Pat. Off. |
| 583001 | 8/1933 | Germany |
| 283281 | 10/1990 | Germany |
| 283282 | 10/1990 | Germany |
| 283283 | 10/1990 | Germany |
| 2158431 | 11/1985 | United Kingdom |

OTHER PUBLICATIONS

Chemical Abstracts, vol. 107, No. 22, Nov. 30, 1987, Abstract No. 203858, XP002029578.
Chemical Abstracts, vol. 51, No. 16, Aug. 25, 1957; Abstract No. 13347c, column 1; XP002029579.
Chemical Abstracts, vol. 116, No. 2, Jan. 13, 1992; Abstract No. 10309k, XP000389517.
Chemical Abstracts, vol. 115, No. 14, Oct. 7, 1991; Abstract No. 141073f, XP000318093.
Patent Abstracts of Japan, vol. 013, No. 107 (C-576), Mar. 14, 1989 & JP 63282139, Nov. 18, 1988.

*Primary Examiner*—Timothy M. Speer
*Attorney, Agent, or Firm*—Howrey & Simon

[57] ABSTRACT

Radiation stable glass for space applications, especially glass in the form of thin sheet for cladding of spacecraft, is produced by including at least 5% by weight of barium oxide in a borosilicate glass composition. Because barium has a low absorption in the ultra violet, its use enables radiation stable glasses of low ultra violet absorption to be produced, alleviating problems of overheating when the glasses are used for cladding space craft. The glass is useful in the production of solar cell cover slips and second surface mirrors for cladding purposes, and space applications generally.

21 Claims, 1 Drawing Sheet

BOROSILICATE GLASSES AND SECOND SURFACE MIRRORS THEREOF

BACKGROUND OF THE INVENTION

1. Field of the Invention

This invention relates to glasses having good stability to radiation useful as cladding glasses in space and terrestrial applications, and to cladding panes composed of such glasses.

On irradiation with high energy radiation typically encountered in space, glass tends to discolour, reducing the transmission of the glass and increasing its solar absorptance. Thus, radiation stability is a particular requirement of glasses used as cladding glasses in space applications, for example, as solar cell cover slips or as the glass substrates of second surface mirrors used as cladding to protect spacecraft from overheating.

2. Description of the Prior Art

It is known, for example from EP 0 261 885A1 and EP 0 505 061A2, to use borosilicate glasses, stabilised against the effects of irradiation by the incorporation of cerium (typically in amounts of 2% to 5% by weight), for production of solar cell cover slips having a high transmission in the visible and infra-red regions of the spectrum. Cerium has very broad absorption bands in the ultra-violet region of the spectrum at 240 nm and 315 nm. This absorption in the ultra-violet may be beneficial when the glasses are to be used in solar cell cover slips, for example, in protecting the adhesive used to bond the cover slips to the cells from ultra-violet radiation which would otherwise tend to degrade the adhesive. However, when the same base glasses are used, with a reflective coating on the back surface, as second surface mirrors to clad the exterior surface of a space craft and reflect unwanted solar radiation incident upon it, the absorption in the ultra-violet leads to an undesirable build-up of heat in the glass.

Thus there is a need for a method of stabilising a high transmission borosilicate glass to radiation especially radiation encountered in space, which does not rely on the use of cerium (or any other element which absorbs significantly in the spectral region from 250 nm wavelength to 2500 nm wavelength). It has now been found, and the discovery forms the basis of the present invention, that borosilicate glasses may be stabilised against radiation by inclusion of barium.

SUMMARY OF THE INVENTION

According to the present invention, there is provided a radiation stable borosilicate glass in sheet form having a thickness less than 1 mm characterised in that the glass contains more than 5% by weight of barium (calculated as barium oxide) whereby its radiation stability is enhanced.

Preferably, the glass sheet has a cut-on of less than 340 nm (i.e. the transmission of the glass sheet increases above 50% at a wavelength less than 340 nm).

The radiation stability of a glass in space may be estimated by subjecting a thin polished sample of glass to an electronic bombardment in vacuum and measuring the change in the optical characteristics of the glass. Radiation stable glasses typically have a radiation stability such that, if a polished sample pane of the glass 150 microns thick is exposed to $5.7 \times 10^{15}$ 1 MeV electrons per square centimetre of glass in vacuum ($<1 \times 10^{-3}$ torr), its solar absorptance changes by less than 0.05. Solar absorptance is the ratio of radiant energy absorbed by a body to that incident upon it in the region 250 nm to 2500 nm integrated over the air mass zero solar spectrum. Preferred glasses show a change in solar absorptance of less than 0.04, and especially preferred glasses changes of less than 0.03. For use in second surface mirrors for the cladding of space craft, it is preferred to select glasses having a solar absorptance, after testing as described above, of less than 0.06, and preferably less than 0.04.

BRIEF DESCRIPTION OF THE DRAWINGS

The single figure of the drawings illustrates, in diagrammatic form, a section through a second surface mirror in accordance with the invention.

The second surface mirror 1 comprises a thin (less than 1 mm, typically around 0.2 mm) pane 2 of borosilicate glass with a reflecting coating 3, for example of silver, on the back surface.

DETAILED DESCRIPTION OF THE PREFERRED EMBODIMENTS OF THE INVENTION

Figure 1:
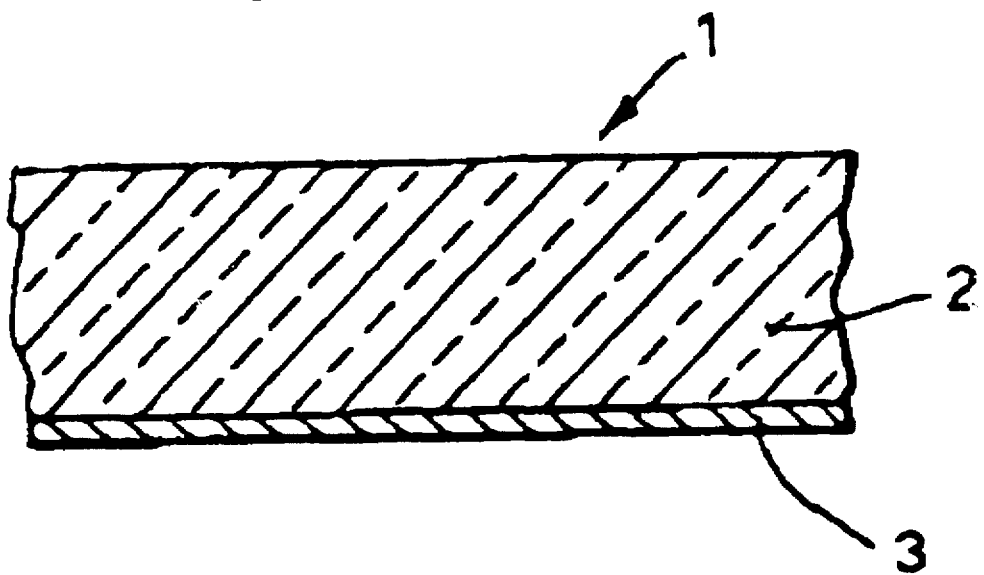

The barium serves not only to stabilise the glass against radiation, but aids melting of the glass. Its presence also enhances the emissivity of the glass which is important for a cladding glass which is required to facilitate heat loss through the glass. However, while barium is preferably present in an amount of over 8% (calculated as barium oxide) and may be present in an amount up to 25% (calculated as barium oxide), amounts above 20% will normally be avoided for space applications (where the contribution of barium to the weight of the glass becomes significant), and preferred glasses contain 8 to 18% of barium oxide.

Silica is the principal network former in the glass composition. In amounts of 50 to 75% by weight it provides good durability to chemical attack. Preferred glasses contain up to 70% by weight $SiO_2$.

The use of boron oxide is believed to assist the radiation stability of the glass and to provide a glass of high emissivity; it is also a useful flux for glass making. At least 5%, and preferably at least 10% $B_2O_3$ will normally be present in the glass. Unfortunately, excessive boron contents tend to detract from the durability of the glass and the $B_2O_3$ will therefore not normally exceed 30% by weight, with a $B_2O_3$ content in the range 10 to 20% by weight being preferred.

Alumina assists in improving the durability of glasses without adversely affecting its solar radiation stability, and also assists in achieving high emissivity. When alumina is used in the glasses of the present invention, it will normally be present in an amount up to 15% by weight, and such that $B_2O_3+SiO_2+Al_2O_3$ is in the range 60 to 93% by weight.

Zirconia plays a similar role to alumina, providing durability without adversely affecting the radiation stability. If used, zirconia will generally be present in an amount up to 12% by weight, but preferably less than 5% by weight The alkali metal oxides are useful as fluxes for melting the glass, although when used in too high a proportion the durability of the glass may be adversely affected. Thus the total alkali metal oxide content of the glasses of the present invention will normally be maintained below 25% by weight, with the alkali metal oxide content preferably in the range 8 to 20% by weight. Potassium oxide is favoured since it is believed to assist in stabilising the glass against radiation damage; moreover, despite its high atomic weight, its inclusion tends to lead to a less dense structure. The inclusion of potassium also tends to increase the electrical conductivity of the glass, helping to prevent build-up of static electricity. Sodium oxide may also be used as a flux, the advantage being a more electrically conductive glass, but usually with less radiation stability. To maintain high radiation stability, sodium oxide will normally be restricted to a maximum of 10% by weight when used in the glasses of the present invention. Lithium oxide greatly assists in melting the glasses even when present in small amounts. Above 2% by weight lithium oxide, the risk of phase separation and devitrification increases significantly and it is preferred to avoid more than 3% lithium oxide.

Thus, according to a preferred aspect of the present invention, the thin borosilicate glass sheet of the invention comprises, in percent by weight:

5 to 20% of BaO 5 to 30% of $B_2O_3$ 50 to 75% of $SiO_2$ 0 to 15% of $Al_2O_3$ provided that $B_2O_3+SiO_2+Al_2O_3$ is in the range 60% to 93% and 2 to 25% of $R_2O$ where $R_2O$ is $Li_2O$ and/or $Na_2O$ and/or $K_2O$. Other materials used in glass making may be included provided they do not have any unacceptable detrimental effect on the glass. Thus, in addition to barium oxide, other alkaline earth metal oxides especially magnesium oxide, calcium oxide and strontium oxide may be present and will aid the melting of the glass. However, a total alkaline earth metal oxide content above 25% will normally be avoided, as it leads to a deterioration in glass durability and can adversely affect the stability of the glass to radiation.

Refining agents, such as antimony oxide, $Sb_2O_3$ and arsenic oxide, $As_2O_3$, which are commonly used in amounts of around 0.5% by weight, may be used, but will not generally be present in amounts of more than about 2% by weight. If required, for example to aid refining, the viscosity of the glass may be reduced by incorporation of a small amount of fluorine, typically up to about 1% by weight.

The presence of rare metal and other heavy metal non-colouring metal oxides may be tolerated in small amounts, for example up to about 5% by weight, but they are preferably avoided for space applications where their weight would be a penalty. Zinc oxide and lead oxide are preferably avoided (and, if present, each used in amount of less than 2% by weight) as their presence tends to lead to darkening of the glass on irradiation. Tin oxide may be used, and appears to decrease the solar absorptance of the glass.

The radiation stability of the glasses may be improved still further by the inclusion of cerium oxide and/or titanium oxide. However, as noted above, cerium absorbs strongly in the ultra violet, while titanium has weak absorptions in the ultra violet region of the spectrum. Thus, where a low solar absorptance is important, as for second surface mirrors for cladding space craft, only small amounts of cerium (say up to 2% by weight, calculated as $CeO_2$), or titanium (say up to 0.2% by weight, calculated as $TiO_2$) will normally be used, and carefully controlled to ensure that a satisfactorily low solar absorptance is achieved. However, for applications where a greater increase in absorptance in the ultra violet region is acceptable, greater amounts of ceria (say up to 7% by weight) and titania (say up to 1% by weight) may be acceptable.

Colouring metal oxides will generally be avoided where possible, since their presence will reduce the transmission of the glass (increasing its solar absorptance), although small quantities, for example arising from impurities, may be tolerated provided their use does not result in any unacceptable detrimental effect on the radiation stability of the glass.

The barium containing glasses used in the thin glass sheet of the present invention have surprisingly good radiation stability and are useful for other purposes. Many of the glass compositions are novel and, according to a further aspect of the present invention, there is provided a radiation stable borosilicate glass characterised in that it comprises, in percent by weight:

>8% of BaO 6 to 30% of $B_2O_3$ 50 to 75% of $SiO_2$ 0 to 15% of $Al_2O_3$ provided that $B_2O_3+SiO_2+Al_2O_3$ is in the range 60% to 93% and 7 to 25% of $R_2O$ where $R_2O$ is $Li_2O$ and/or $Na_2O$ and/or $K_2O$.

The invention is illustrated but not limited by the exemplary glass compositions (suitable for the production of thin sheet for use in second surface mirrors and solar cell cover slips) set out in the following Table 1. In Table 1 the glass compositions are shown in percentages by weight calculated on an oxide basis, assuming the elements to be present in the form of the oxide shown (except that fluorine is calculated as such).

The glasses of Table 1 were melted in an electric furnace (although fossil fuel furnaces may be used if required) at a temperature of 1400° C. Their forming temperatures (i.e. the temperatures at which they exhibited a viscosity of 10,000 poise, referred to in the table as "log 4") were within normal ranges for drawing into thin sheet glass ("microsheet") of thickness less than 1 mm by, for example, known down draw processes. Their liquidus temperatures were lower then the "log 4" temperatures indicating that may be formed into sheet without devitrification faults. The measured log 2½ values (i.e. the temperatures at which the glasses exhibit a viscosity of about 300 poise) indicate that the glasses can be melted at normal glass making temperatures.

The chemical durability values quoted were determined using the ISO 719 standard test In the test, 0.2 grams of glass grains are boiled with 50 ml of grade 2 water for 60 minutes at 98° C. and the released alkali titrated against 0.01M hydrochloric acid. For applications in accordance with the present invention, a durability of at least HGB3, preferably HGB2 or HGB 1, is desirable.

Table 2 shows transmission properties of the glasses (measured over a path length of 150 microns) before and after irradiation of a glass sample 150 microns thick with 1 MeV electrons at a fluence of $5.7 \times 10^{15}$ e/cm². The "cut-on" is the wavelength at which the glass exhibited a UV transmission of 50%, UVT is the percentage transmission over the range 300 to 320 nm, while T400, T500 and T600 are the percentage transmissions at wavelengths of 400 nm, 500 nm and 600 nm respectively.

The corresponding "target" figures for a glass for use in second surface mirrors, together with the measured figures for a number of known glasses, are shown in the early columns of Table 2. Preferred glasses for this application achieve corresponding values after irradiation under the conditions indicated above of <340 nm ("cut-on"), >86% (T400), >88% (T500) and >90% (T600), whilst the best glasses exhibit <340 nm ("cut-on"), >88% (T400), >90% (T500), >91% (T600) with a change in solar absorptance on irradiation (as described above) of less than 0.03.

TABLE 1

| Example | 1 | 2 | 3 | 4 | 5 | 6 | 7 |
|---|---|---|---|---|---|---|---|
| $SiO_2$ | 55 | 50 | 70 | 62 | 70 | 51 | 59.5 |
| $Li_2O$ |  |  |  |  | 2 |  |  |
| $Na_2O$ |  |  |  |  | 4 | 2 |  |
| $K_2O$ |  | 10 | 20 | 5 | 10 | 6 | 10 | 10 |
| BaO |  | 10 | 10 | 15 | 10 | 6 | 10 | 10 |
| $B_2O_3$ |  | 15 | 15 | 10 | 10 | 6 | 15 | 15 |
| $Al_2O_3$ |  | 10 | 5 |  | 5 | 5 |  | 5 |
| $Sb_2O_3$ |  |  |  |  |  |  |  |  |
| $TiO_2$ |  |  |  |  |  | 1.0 |  |  |
| $CeO_2$ |  |  |  |  |  |  |  | 0.5 |
| Other |  |  |  |  | $SnO_2$ 3 |  | $ZrO_2$ 12 |  |
| Liquidus temp (850–1150° C.) | no crystals seen |  |  |  |  |  | no crystals seen |
| Durability | HGB1 |  |  |  |  |  | HGB2 |
| log 2½ 0° C. | 1460 |  |  |  |  |  | 1365 |
| log 4 0° C. | 1115 |  | 1176 |  |  |  | 1072 |
| Strain point 0° C. | 556 |  |  |  |  |  | 575 |
| Annealing temp 0° C. | 585 |  |  |  |  |  | 601 |
| Exp (20–300° C.) | 65.7 |  |  |  |  |  | 65.7 |
| Electrical 0° C. | $10^{-17.3}$ |  |  |  |  |  | $10^{-18.6}$ |
| conductivity 60° C. | $10^{-14.8}$ |  |  |  |  |  | $10^{-14.8}$ |
| Density gram/cc | 2.4950 |  |  |  |  |  | 2.53 |

| Example | 8 | 9 | 10 | 11 | 12 | 13 | 14 | 15 |
|---|---|---|---|---|---|---|---|---|
| $SiO_2$ | 59.2 | 59 | 52.2 | 70.8 | 54.5 | 59.5 | 59.1 | 59.3 |
| $Li_2O$ |  |  |  | 2 |  |  |  |  |
| $Na_2O$ |  |  |  | 4 |  | 10 |  |  |
| $K_2O$ | 10 | 10 | 15 | 6 | 10 |  | 10 | 10 |
| BaO | 10 | 10 | 10 | 6 | 15 | 10 | 10 | 10 |
| $B_2O_3$ | 15 | 15 | 15 | 6 | 20 | 15 | 15 | 15 |
| $Al_2O_3$ | 5 | 5 | 5 | 5 |  | 5 | 5 | 5 |
| $Sb_2O_3$ |  |  |  |  | 0.2 |  | 0.4 |  |
| $TiO_2$ |  |  | 0.1 |  |  |  |  | 0.1 |
| $CeO_2$ | 0.8 | 1.0 | 0.2 | 0.2 | 0.1 | 0.5 | 0.5 | 0.6 |
| Other |  | $ZrO_2$ 2.5 |  |  | $F_2$ 0.2 |  |  |  |
| Liquidus temp (850–1150° C.) |  |  |  |  |  | No crystals seen |  |  |
| Durability | HGB2 |  |  |  |  | HGB1 |  |  |
| log 2½ 0° C. | 1240 |  |  |  |  | 1195 |  |  |
| log 4 0° C. | 1008 |  |  |  |  | 950 |  |  |
| Strain point 0° C. | 577 |  |  |  |  | 552 |  |  |
| Annealing temp 0° C. | 601 |  |  |  |  | 572 |  |  |
| Exp (20–300° C.) | 77.3 |  |  |  |  | 70.5 |  |  |
| Electrical 0° C. | $10^{-17}$ |  |  |  |  | $10^{-14.3}$ |  |  |
| conductivity 60° C. | $10^{-13.6}$ |  |  |  |  | $10^{-10.4}$ |  |  |
| Density gram/cc | 2.627 |  |  |  |  | 2.6075 |  |  |

TABLE 2

|  | Window Glass[1] | Pyrex[2] | Lead Flint[3] | Barium Crown[4] | Solar Cell Cover Glass[5] | Target |
|---|---|---|---|---|---|---|
| Cut on before (nm) | <280 | <280 | 294 | <280 | 355 |  |
| after | <280 | <280 | 364 | <280 | 360 | <340 |
| UVT before | 91.4 | 90 | 81.0 | 89.2 | 0.1 |  |
| after | 68.2 | 67.4 | 34.9 | 71.5 | 0.1 |  |
| T400nm before | 92.1 | 90.9 | 87.3 | 91.4 | 85.1 |  |
| after | 66.9 | 80.3 | 61.3 | 81.6 | 83.1 | >83% |
| T500nm before | 92.5 | 91.1 | 87.3 | 91.7 | 89.9 |  |
| after | 73.5 | 84.6 | 79.6 | 84.6 | 89.7 | >86% |
| T600nm before | 92.8 | 91.5 | 87.9 | 92.0 | 90.9 |  |
| after | 78.1 | 88.2 | 87.9 | 85.3 | 91.0 | >87.0% |
| Solar absorptance before |  |  |  |  | 0.0560 |  |
| after |  |  |  |  | 0.0585 | <0.06 |
| Change in solar absorptance | 0.096 | 0.037 | 0.143 | 0.038 | 0.0025 | <0.04 |
| Emissivity |  |  |  |  |  | >0.8 |

[1] Composition: 72.6% $SiO_2$, 13% $Na_2O$, 0.9% $K_2O$, 4% MgO, 8.4% CaO, 1.1% $Al_2O_3$
[2] Composition: 80% $SiO_2$, 4.5% $Na_2O$, 0.3% $K_2O$, 0.1% CaO, 12.5% $B_2O_3$, 2.6% $Al_2O_3$
[3] Designation ELF 561452, composition 60% $SiO_2$, 4% $Na_2O$, 9% $K_2O$, 1% CaO, 26% PbO
[4] Designation DBC 564608, composition 49% $SiO_2$, 2% $Na_2O$, 5% $K_2O$, 30% BaO, 2% ZnO, 9% $B_2O_3$ and 3% $Al_2O_3$
[5] commercially available borosilicate type glass, doped with nominal 5% cerium oxide.

| Example | 1 | 2 | 3 | 4 | 5 | 6 | 7 |
|---|---|---|---|---|---|---|---|
| Cut on (nm) |  |  |  |  |  |  |  |
| before | <250 | <250 | <250 |  | 289 |  | 325 |
| after | <200 | <200 | <200 | 282 | 293 |  | 331 |
| UVT |  |  |  |  |  |  |  |
| before | 94.99 | 95.18 | 92.2 | 90.6 | 83.8 | 87.4 | 30.10 |
| after | 87.54 | 90.84 | 82.8 | 64.0 | 74.0 | 80.3 | 21.32 |
| T400nm |  |  |  |  |  |  |  |
| before | 91.47 | 91.16 | 92.6 | 91.4 | 91.6 | 89.2 | 91.32 |
| after | 86.37 | 88.46 | 86.3 | 86.0 | 83.4 | 83.8 | 89.92 |
| T500nm |  |  |  |  |  |  |  |
| before | 91.78 | 91.42 | 92.5 | 91.6 | 91.7 | 89.9 | 91.75 |
| after | 89.62 | 89.34 | 88.3 | 90.2 | 88.5 | 87.0 | 91.38 |
| T600nm |  |  |  |  |  |  |  |
| before | 92.03 | 91.48 | 92.7 | 91.8 | 91.8 | 90.4 | 91.80 |
| after | 89.55 | 89.46 | 89.2 | 91.4 | 89.9 | 87.5 | 91.65 |
| Solar absorptance |  |  |  |  |  |  |  |
| before |  |  | 0.0013 | 0.0010 | 0.0082 | 0.0065 |  |
| after |  |  | 0.0243 | 0.0217 | 0.0325 | 0.0239 |  |
| Change in solar absorptance |  |  | 0.023 | 0.0207 | 0.0243 | 0.0174 |  |
| Emissivity | 0.08932 | 0.8830 |  |  |  |  |  |

| Example | 8 | 9 | 10 | 11 | 12 | 13 | 14 | 15 |
|---|---|---|---|---|---|---|---|---|
| Cut on (nm) |  |  |  |  |  |  |  |  |
| before | 335 | 333 | 294 | 324 | 289 | 328 | 326 | 328 |
| after | 341 | 337 | 320 | 328 | 325 | 335 | 335 | 334 |
| UVT |  |  |  |  |  |  |  |  |
| before | 7.23 | 10.98 | 57.68 | 43.0 | 57.9 | 23.68 | 29.16 | 22.76 |
| after | 3.94 | 7.19 | 44.89 | 30.8 | 38.4 | 14.36 | 16.57 | 15.22 |
| T400nm |  |  |  |  |  |  |  |  |
| before | 91.03 | 91.06 | 91.12 | 93.8 | 90.2 | 91.30 | 91.50 | 91.31 |
| after | 89.39 | 90.18 | 89.07 | 89.6 | 86.7 | 89.57 | 87.98 | 89.90 |
| T500nm |  |  |  |  |  |  |  |  |
| before | 91.81 | 91.81 | 91.50 | 94.0 | 90.9 | 91.60 | 91.95 | 91.76 |
| after | 91.30 | 91.55 | 90.39 | 90.9 | 90.0 | 91.02 | 91.03 | 91.51 |
| T600nm |  |  |  |  |  |  |  |  |
| before | 91.99 | 91.96 | 91.64 | 94.0 | 91.4 | 91.75 | 92.08 | 91.98 |
| after | 91.62 | 91.81 | 90.62 | 91.7 | 90.7 | 91.37 | 91.58 | 91.80 |
| Solar absorptance |  |  |  |  |  |  |  |  |
| before |  |  |  |  | 0.0143 | 0.0164 |  |  |

TABLE 2-continued

| | | |
|---|---|---|
| after | 0.0323 | 0.0331 |
| Change in solar absorptance Emissivity | 0.0180 | 0.0167 |

Examples 1 to 6 show, in comparison with the prior art cerium free glasses, the excellent stability of the barium borosilicate base glass to radiation. It is notable that the radiation stability is better than that of the known barium crown glass, presumably because of the lower levels of silica and boron in those glasses. The measured values of solar absorptance (Examples 3 to 6) after irradiation confirm that the high retained transmissions across the spectrum are leading to low absorption of solar radiation by the glass. Examples 4 to 6 show $SnO_2$, $TiO_2$ and $ZrO_2$ can be included in the base glass without deterioration of radiation stability.

Examples 7 to 15 show that the radiation stability may be improved still further by addition of cerium oxide, although, as the amount of cerium is increased, the ultra violet transmission falls so that, above about 2% $CeO_2$ the solar absorptance is likely to exceed the low values sought for second surface mirrors.

The measurements of chemical durability on Examples 1, 7, 10 and 13 show satisfactory performances. It is believed that the inclusion of zirconia in Example 10 is helpful in maintaining the chemical durability in the presence of a high proportion of potassium oxide.

The sample glasses all have a medium expansion coefficient of about 60 to $80 \times 10^{-7}/°C$. in the range 20 to 300°C. and are suitable for use as cover slips for silicon or gallium arsenide solar cells.

For weight reasons, the glasses having a density below 2.7 are preferred for space applications.

The glasses of the present invention may be used in sheet form as cladding glasses for both terrestrial and space applications. For terrestrial applications, the thickness of the glass will depend on the required mechanical properties as well as the optical properties needed, but may be less than 1 mm. For space applications, weight is normally critical, and the glass will commonly be used in the form of sheets or panes less than 0.3 mm (300 microns) preferably less than 0.2 mm (200 microns) thick. It will be appreciated that, when absorbing constituents are used (such as cerium oxide and titanium oxide, which both absorb in the ultra violet) the amount should be selected having regard not only to the required properties of the pane or sheet, but also to its thickness. Thus, for example, the amount of cerium oxide that may be used, without increasing the solar absorptance to a value higher than appropriate for a second surface mirror, will depend on the thickness of the pane used to form the mirror.

For second surface mirrors (also known as optical solar reflectors) the glass will normally be used in a thickness of less than 300 microns with a reflecting coating on the rear i.e. second surface of the glass. Such second surface mirrors are used as passive thermal control devices on the main bodies of satellites. They are used on the sun-facing sides of satellites and reflect incoming solar radiation while simultaneously radiating internally generated heat. Thus, for this application it is preferred that the glass has not only a low solar absorptance (so a high proportion of incident solar radiation is reflected), but also a high emissivity, preferably at least 0.8 (to facilitate radiation of internally generated heat).

According to a further aspect of the present invention there is provided a second surface mirror comprising a pane of radiation stable borosilicate glass having a cut-on of less than 340 nm and a reflecting coating on one surface thereof. A second surface mirror may comprise a sheet of thin barium borosilicate glass according to the invention with a reflecting coating on one surface thereof.

The coating is preferably of silver, which may be overcoated with a protective layer, for example of metal alloy. For this application, such coatings are normally deposited by vacuum techniques such as sputtering.

If desired, the second surface mirror may be provided with a conductive coating, for example of tin doped indium oxide, on its front surface to alleviate build-up of static electricity on the surface of the satellite.

According to a further aspect of the present invention, there is provided a solar cell cover slip comprising a sheet of barium borosilicate glass according to the invention.

We claim:

1. A radiation stable borosilicate glass in sheet form having a sheet thickness of less than 1mm characterised in that the glass contains more than 5% by weight of barium, calculated as barium oxide, and up to 2% by weight of cerium, calculated as $CeO_2$.

2. A borosilicate glass in sheet form according to claim 1 wherein the sheet over a path length of 150 microns has a cut-on at less than 340 nm.

3. A borosilicate glass in sheet form according to claim 1 wherein the glass comprises, in percent by weight 5 to 20% of BaO
    5 to 30% of $B_2O_3$
    50 to 75% of $SiO_2$
    0 to 15% of $Al_2O_3$ provided that $B_2O_3+SiO_2+Al_2O_3$ is in the range 60% to 93% and 2 to 25% of $R_2O$ where $R_2O$ is $Li_2O$ and/or $Na_2O$ and/or $K_2O$.

4. A borosilicate glass in sheet form according to claim 3 wherein the glass comprises 8 to 18% by weight of BaO.

5. A borosilicate glass in sheet form according to claim 3 wherein the glass comprises 10 to 20% by weight of $B_2O_3$.

6. A borosilicate glass in sheet form according to claim 3 wherein the glass comprises 8 to 20% by weight of $R_2O$ wherein $R_2O$ is $Li_2O$ and/or $Na_2O$ and/or $K_2O$.

7. A borosilicate glass in sheet form according to claim 3 wherein the glass comprises 6 to 20% by weight of $K_2O$.

8. A borosilicate glass in sheet form according to claim 3 wherein the glass additionally comprises cerium oxide.

9. A borosilicate glass in sheet form according to claim 3 wherein the glass additionally comprises titanium oxide.

10. A solar cell sover slip comprising a borosilicate glass sheet according to claim 1.

11. A borosilicate glass in sheet form according to claim 1 wherein not more than 1.0% by weight of cerium, calculated as $CeO_2$ is present.

12. A borosilicate glass in sheet form according to claim 1 free of cerium oxide.

13. A radiation stable borosilicate glass characterised in that it comprises, in percent by weight:

>8% of BaO
    6 to 30% of $B_2O_3$
    50 to 75% of $SiO_2$
    0 to 15% of $Al_2O_3$ provided that $B_2O_3+SiO_2+Al_2O_3$ is in the range 60% to 85% and 7 to 25% of $R_2O$ where $R_2O$ is $Li_2O$ and/or $Na_2O$ and/or $K_2O$.

14. A borosilicate glass according to claim 13 comprising at least 8% by weight of $R_2O$ where $R_2O$ is $Li_2O$ and/or $Na_2O$ and/or $K_2O$.

15. A borosilicate glass according to claim 13 having, over a path length of 150 microns, a cut-on of less than 340 nm.

16. A borosilicate glass according to claim 13 comprising up to 18% by weight of BaO.

17. A borosilicate glass according to claim 13 comprising 10% to 20% by weight of $B_2O_3$.

18. A borosilicate glass according to claim 13 comprising 6% to 20% by weight of $K_2O$.

19. A borosilicate glass according to claim 13 additionally comprising cerium oxide.

20. A borosilicate glass according to claim 13 additionally comprising titanium oxide.

21. A solar cell cover slip comprising a sheet of borosilicate glass according to claim 13.

* * * * *